United States Patent [19]

Richey

[11] 3,853,930

[45] Dec. 10, 1974

[54] PROCESS FOR TREATING LANOLIN AND LANOLIN DERIVATIVES

[76] Inventor: Thomas B. Richey, 576 North Chestnut St., Westfield, N.J. 07090

[22] Filed: Feb. 4, 1972

[21] Appl. No.: 223,718

[52] U.S. Cl. .............................. 260/428, 260/428.5
[51] Int. Cl. ............................................. C09f 5/10
[58] Field of Search ..................................... 260/428

[56] References Cited
UNITED STATES PATENTS

| | | | |
|---|---|---|---|
| 3,272,850 | 9/1966 | Richey, Jr. et al. | 260/428 |
| 3,272,851 | 9/1966 | Sunde et al. | 260/428 |

OTHER PUBLICATIONS

Edmundson et al., Ind. Med. Surg., 36, (12), 1967, pp. 806–809.

Primary Examiner—Lewis Gotts
Assistant Examiner—Ethel G. Love

[57] ABSTRACT

Lanolin and lanolin derivatives as normally available at the present time contain traces of one or another of the chlorinated hydrocarbon pesticide compounds commonly used in the treatment of sheep for control of ectoparasites. Herein is disclosed a method for the treatment of lanolin and lanolin derivatives, whereby the chlorinated hydrocarbon pesticide content thereof is substantially reduced. The method herein disclosed involves subjecting lanolin or derivatives thereof to treatment at elevated temperatures, while in the form of a relatively slowly moving whirling or socalled "wiped film" of relatively minute thickness, while held under vacuum.

4 Claims, No Drawings

PROCESS FOR TREATING LANOLIN AND LANOLIN DERIVATIVES

This invention relates to the production of lanolin and lanolin derivatives of reduced pesticide content, and to a method of reducing the normal pesticide content of lanolin and lanolin derivatives.

More particularly, the invention is concerned with the production of lanolin and lanolin derivatives containing substantially less than their normal content of pesticides.

Still more particularly, the invention is concerned with a method of substantially reducing the pesticide content of lanolin and lanolin derivatives containing chlorinated hydrocarbon compounds of the character which are in wide general use as pesticides.

Chlorinated hydrocarbon compounds are extensively employed for, inter alia, the control of ectoparasites which are prevalent on sheep and other animals. In the case of sheep, these pesticides are absorbed by or otherwise taken up the wool fat and other natural animal fats and oils contained in sheep wool. Lanolin which is extracted from sheep wool, as well as derivatives of such lanolin, contain identifiable concentrations of these compounds. Traces of some of these compounds are also frequently present in various cosmetic compositions in which lanolin or a lanolin derivative constitutes an important ingredient.

The more commonly used chlorinated hydrocarbon pesticidal compounds prevalent in sheep wool, and hence present in lanolin and lanolin derivatives are dichlorodiphenyl trichloroethane (DDT); 1,2,3,4,5,6-hexachlorocychlohexane (Lindane); the gamma isomer thereof (gamma BHC); and the chlorinated hydrocarbon composition containing not less than 85 percent of the endo-exo-isomer of 1,2,3,4,10,10$a$-hexachloro-6,7,-epoxy-1,4,4$a$,5,6,7,8,8$a$-octahydro-1,4,5,8-dimethanonaphthalene, the balance being insecticidally active related compounds (the foregoing composition being known by the assigned common name of "Dieldrin").

The method of the present invention has been found to be particularly effective for the processing of lanolin and lanolin derivatives in order to effect a substantial removal of their normal content of these pesticidal compounds.

The presence of these pesticidal compounds in cosmetic compositions having lanolin or a derivative thereof as an important constituent is distincely detrimental.

The maximum amount of these pesticides usually considered as permissible in cosmetic compositions is of the order of seven parts per million. An amount in excess of that concentration is deemed prohibitive in numerous areas.

The concentration of the various chlorinated hydrocarbon pesticidal compounds present in lanolin and lanolin derivatives varies considerably, even as between different lots of lanolin. The variations depend mainly upon the pest control practices utilized by the sheep raisers, the number of times and the frequency with which the sheep have been treated with the pesticide, and the processing of the wool fat.

In consequence of the foregoing, cosmetic compositions containing lanolin or lanolin derivatives frequently contain detrimental amounts of the above-mentioned pesticides. In general, it may be stated that the concentration of chlorinated hydrocarbon pesticide present in such cosmetics is substantially in excess of that permissible. The concentration thereof may vary from about five to about 20 or even more parts per million.

The principal object of the invention is to provide lanolin and lanolin derivatives containing pesticides of the chlorinated hydrocarbon type in an amount not in excess of about five parts per million.

Another object of the invention is to provide a method for removal of pesticides, particularly those of the chlorinated hydrocarbon type, from lanolin and lanolin derivatives, so as to bring the pesticide concentration thereof to a figure substantially below five parts per million.

Another object of the invention is to provide a method of the character described, which is capable of reducing the content of the aforesaid type of pesticide from a concentration in excess of seven parts per million, to a concentration well below that figure.

More specifically, it is an object of the invention, to provide a process for the removal of pesticides of the type herein referred to, from lanolin and lanolin derivatives containing the same, whereby the pesticide content thereof is reduced by at least twenty per cent of the original concentration thereof, desirably from about 20 to at least 50 percent thereof.

In accordance with the invention, the foregoing objects are achieved, briefly stated, by subjecting the pesticide-containing lanolin or lanolin derivative to thermal processing during a relatively brief period of time while in the form of a spirally descending "wiped film" of relatively minute thickness and while held under a substantial vacuum.

In actual practice of the invention, the processing of pesticide-containing lanolin or lanolin derivatives to effect the removal of at least about 20 percent of the pesticide content thereof, may be achieved by the use of any of the well-known forms of so-called "wiped film" processors. One form of such processor preferred for the practice of the invention, is known as the Votator "Turba-film Processor."

Although the above-mentioned Votator "Turba-film Processor" is preferred for practicing the process of the inveition, other known forms of the so-called "wiped film" processors may be utilized. Among such other forms of apparatus are the Pfaudler "Wiped Film Evaporator;" the Luwa "Thin Layer Evaporator;" and the "Kontro Evaporator."

The Votator "Turba-film Processor" above-mentioned and which is the preferred form of apparatus utilized in the practice of the present invention, comprises essentially a relatively elongated, vertically disposed, jacketed tube provided with a bladed rotor disposed therein and arranged to operate with the periphery of the blades in very close proximity to the inner wall of the jacket. The jacket is provided with means for admitting a heating medium thereto and for discharging the same therefrom. The heating medium may be steam or liquid "Dowtherm."

In the Votator "Turba-film Processor," the liquid material to be treated is whirled peripherally at a high rate, in the form of a film of relatively minute thickness. The material being treated is thus very rapidly brought to the temperature of the inner wall of the tube jacket. The turbulent, whirling thin film resulting from the action of the rotor blades is centrifugally held in contact with the inner wall of the jacket while flowing downwardly by gravity through the tube and to the discharge head at the bottom thereof. Thus, the liquid material fed through the tube has a low residence time therein, which may be from say, 5 to 90 seconds. This, together with the turbulent motion of the downwardly flowing thin film of the material prevents localized overheating thereof. The extremely rapid heat transfer from the jacket through the inner wall thereof heats up the liquid almost instantaneously, viz., in a matter of 10 seconds or less.

Simultaneously therewith the lanolin material flowing downwardly as a thin film on the wall of the tube is subjected to the action of a stripping agent flowing countercurrently through the tube. The stripping agent may be steam or other inert gas. For example, steam injected at a rate of 2 to 20 pounds per hour, desirably 15 pounds per hour, has been found to suffice for the purpose.

In utilizing the above-described form of apparatus for the practice of the present invention, with the rotor in the tube operated at a peripheral speed of 25 to 50 feet per second, with a jacket temperature of from 300° to 550° F., a feed rate of 50 to 200, preferably 85 to 175, pounds per hour, and a vacuum of between 2 and 30 millimeters mercury (absolute pressure), it has been found possible to remove at least 20 percent, and in certain instances as high as 50 percent or more, of chlorinated hydrocarbon pesticidal compounds from lanolin and lanolin derivatives. In terms of the pesticidal content of lanolin and lanolin derivatives, it may be stated that by the process of the present invention, the concentration of pesticide may be reduced from more than seven and as high as 20 parts per million in the untreated lanolin or lanolin derivative, to a content substantially below seven parts per million.

In the actual practice of the invention, removal of the pesticides from lanolin or lanolin derivatives may be aided or promoted by incorporating therein a minor amount of a relatively high boiling paraffinic hydrocarbon solvent. A preferred example of such solvent is the deodorized, isoparaffinic solvent sold under the trademak "Isopar M" by Humble Oil and Refining Company. This solvent has a flash point (closed cup) of 172° F., a specific gravity (60—60° F.) of 0.7818, and a viscosity of 2.43 cp at 77° F., and 0.719 cp at 212° F.

Although this "Isopar M" material has been found most desirable, and hence preferable, as a solvent or diluent for lanolin and lanolin derivatives in the practice of the present invention, it will be understood that it is but illustrative of other hydrocarbon solvents or diluents that may be employed for the purpose.

Apparently, when such a solvent or diluent is added to lanolin or a lanolin derivative, removal of the solvent or diluent from the lanolin or lanolin derivative which takes place under the operating conditions utilized in the practice of the invention effects a removal of some of the pesticide from the lanolin or lanolin derivative. The manner of and the extent to which pesticides are removed from lanolin or the derivative thereof by reason of the presence of the solvent or diluent has, however, not been fairly established.

In order to illustrate the practice of the invention, a number of experimental runs were carried out for removal of above-named pesticides from lanolin, using a Votator "Turbafilm Processor" for the purpose.

In these runs, lanolin containing 20 parts per million of each of the pesticides DDT, Dieldrin and Lindane, was utilized. To promote the removal of the pesticides, 1 gallon of the above-mentioned "Isopar M" was added to each 55 gallon drum of the lanolin prior to carrying out the runs.

The lanolin employed in these runs was a commercially available product sold by Malmstrom Chemical Corporation under the trademark "Sparklelan." A typical analysis of this product is the following:

| | |
|---|---|
| Color ASTM | 2½ to 3 |
| Free fatty acid (U.S.P. as oleic) | 0.56% Max. |
| Moisture (U.S.P.) | 0.25% Max. |
| Melting Range (U.S.P.) | 36–42°C. |
| Ash (U.S.P.) | 0.1% Max. |
| Iodine Value (U.S.P.) | 18–36 |
| Water Absorption | 400–600% |
| Total Cholesterol | Over 15% |

The "Turba-film Processor" apparatus employed in making the experimental runs herein referred to was one in which the tube has a length of 30 inches and a diameter of 6 inches, and which provides a heat transfer area of 4 square feet.

Table I herebelow sets forth data (1) with respect to the processing conditions utilized in each of the runs, and (2) with respect to the extent of removal of each of the three aforementioned pesticides under the several respective processing conditions therein set forth.

The method of analysis utilized to determine the pesticidal content of the lanolin before and after the treatment of the material by the process of the invention was a gas chromatographic one, using the microcoulometric detector system. A description of this technique is contained in an article entitled "Chlorinated Hydrocarbon Pesticides in Cosmetics," which appeared in Industrial Medicine And Surgery, Vol. 36:12, at pages 806–809, December, 1967.

As will be noted from the data in the foregoing Table I, the process herein set forth is effective for reducing the content of the pesticides in the lanolin to a concentration substantially less than seven parts per million. It will be noted, for example, that the removal of Lindane under the conditions prevailing in Run A amounted to 50 percent when the feed rate was 84 pounds per hour. At a feed rate of 157 pounds per hour in Run B (the

TABLE I

| | Lindane | | | Dielderin | | | DDT | | | Processing Conditions | | | |
|---|---|---|---|---|---|---|---|---|---|---|---|---|---|
| Run | PPM Start | PPM Removed | % Removal | PPM Start | PPM Removed | % Removal | PPM Start | PPM Removed | % Removal | Feed Rate Lbs/Hr | Jacket Temp °F | St. Steam Lbs/Hr | Vacuum mm.Hg. |
| A | 9.4 | 4.7 | 50 | 9.4 | 3.1 | 33.1 | 7.8 | 3.4 | 44.3 | 84 | 350 | 15 | 2.0 |
| B | 9.4 | 3.1 | 33.2 | 9.4 | 4.1 | 43.4 | 7.8 | 3.7 | 47.3 | 157 | 350 | 15 | 2.0 |
| C | 7.8 | 3.1 | 39.7 | 5.0 | 1.2 | 24.0 | 4.4 | 0.3 | 6.8 | 119 | 510 | 15 | 2.0 |
| D | 7.8 | 3.1 | 39.7 | 5.0 | 1.9 | 38.0 | 4.4 | 1.0 | 22.8 | 175 | 510 | 15 | 2.5 | other processing conditions being the same as in Run A) the removal of Lindane was 33.2 percent of the concentration at the start of the run. In the case of DDT, the removal was 44.3 percent at a feed rate of 84 pounds per hour (Run A) and was 47.3 percent at a feed rate of 157 pounds per hour (Run B).

What is claimed is:

1. The method of reducing the pesticide content of pesticide-containing lanolin and lanolin derivatives, which comprises continually feeding a pesticide-containing lanolin material whose content of said pesticide is in excess of about five parts per million of said feed material, into a vertically disposed jacketed chamber and causing the feed material in said chamber to flow downwardly along the inner surface of the chamber in the form of a wiped film of relatively minute thickness, while maintaining the jacket of the chamber at a temperature of 300° to 550° C., and simultaneously subjecting the feed material to the action of an inert vaporous stripping agent, while maintaining the flowing film under a vacuum of between two and thirty millimeters mercury, absolute pressure, said material having incorporated therein, prior to the feeding thereof to said chamber, a minor proportion of paraffinic hydrocarbon diluent, said diluent having a boiling point such that said diluent will be removed from the lanolin or lanolin derivatives under the aforesaid operating conditions, thereby to promote removal of said pesticide from the lanolin or lanolin derivative.

2. The method as defined in claim 1, wherein the pesticide content of lanolin and lanolin derivatives is thereby reduced from a normal concentration of about seven to 20 parts per million to a concentration substantially below seven parts per million.

3. The method defined in claim 1, wherein there is affected a removal of at least 20 percent of the pesticide normally present in the lanolin or lanolin derivative.

4. The method of claim 1, wherein the pesticide is a chlorinated aromatic hydrocarbon compound.

* * * * *